(12) United States Patent
Yang et al.

(10) Patent No.: US 7,352,804 B2
(45) Date of Patent: Apr. 1, 2008

(54) FREQUENCY ESTIMATION METHOD AND SYSTEM

(75) Inventors: Shih-Yang Yang, Sanchong (TW); Zing-Wei Kang, Taipei (TW)

(73) Assignee: Benq Corporation, Taoyuan (TW)

( * ) Notice: Subject to any disclaimer, the term of this patent is extended or adjusted under 35 U.S.C. 154(b) by 653 days.

(21) Appl. No.: 10/890,880

(22) Filed: Jul. 14, 2004

(65) Prior Publication Data

US 2006/0013336 A1 Jan. 19, 2006

(51) Int. Cl.
*H04Q 1/20* (2006.01)

(52) U.S. Cl. .................................... 375/226

(58) Field of Classification Search ............. 375/224, 375/226, 227, 228, 279, 283, 329, 334, 316; 324/76.77, 86, 76.18, 76.25; 327/14
See application file for complete search history.

(56) References Cited

U.S. PATENT DOCUMENTS 4,983,906 A * 1/1991 Hiller ...................... 324/76.47
6,477,214 B1 * 11/2002 Fowler et al. .............. 375/350

* cited by examiner

*Primary Examiner*—Sam K. Ahn
(74) *Attorney, Agent, or Firm*—Thomas, Kayden, Horstemeyer & Risley

(57) ABSTRACT

A multiple linear regression frequency estimation method and system. A phase sequence of a received signal is derived and divided into several subsequences according to predetermined rules. The phase differences of the subsequences are calculated for frequency estimation using linear regression analysis. A plurality of frequency estimation values are obtained corresponding to each subsequence and combined.

18 Claims, 4 Drawing Sheets

FREQUENCY ESTIMATION METHOD AND SYSTEM

BACKGROUND

The present invention relates to frequency estimation for communication systems, and more specifically, to a frequency estimation method and system using a multiple linear regression technique.

In current communication systems, information is transmitted over a channel after modulating to a carrier signal. The carrier is modulated by varying one or more of its parameters, such as amplitude, frequency, or phase, according to the information being transmitted. In the process of transmission, the communication channel alters the characteristics of the transmitted signal and, typically, adds random interference, commonly known as Additive White Gaussian Noise (AWGN). These modifications can make the transmitted signal difficult to recognize at a receiver.

Phase shift keying (PSK) modulation is frequently employed in communication systems, and mobile units may exhibit a significant amount of frequency drift or variation in their local oscillators. Therefore, an important issue during reception is resolution of the frequency inherent in the received signal. The frequency of the received signal typically changes over time due to instability, such that the receiver must continuously estimate phase and frequency to maintain synchronization between the transmitter and receiver.

Training sequences embedded in the received signal are typically used to train or calibrate the receiver before handling actual data. Various techniques have been proposed to determine the frequency of the received signal according to the training sequences. Among these techniques, linear regression is commonly used for frequency estimation, comparing calculation of an angle of each input symbol and a symbol phase difference between a current and a previous symbol. The calculated phase differences are accumulated, and a linear regression analysis is applied to the sum of the phase difference to obtain frequency estimation. The drawback of this frequency estimation method is unreliable performance due to low signal to noise ratio (SNR) increased frequency estimation error when burst error occurs in the pilot signal.

SUMMARY

A multiple linear regression frequency estimation method that calculates several frequency values (slope of the linear regression model) by selecting different combinations of the pilot signal is provided. Outliers of the calculated slopes are discarded, with the remaining slopes averaged as an estimate of the frequency. The disclosed method may reduce the effect of noise, successfully improving on typical linear regression frequency estimation methods.

An embodiment of the multiple linear regression frequency estimation method comprises calculation of a phase sequence of complex samples in a detected frequency correction burst (FB) signal. The calculated phase sequence is divided into at least two phase subsequence according to a predetermined rule. Phase errors are calculated and accumulated for the phase sequence and each phase subsequence, and a linear regression slope of each phase sequence/subsequence is derived according to the linear regression algorithm. The similarities between the linear regression slopes are examined, since the slopes are ideally identical. The similar slopes are treated as acceptable frequency estimation values and these values are averaged as the frequency estimation output. Other slopes are assumed to be outliers and expected to be unreliable estimations, and are thus excluded from frequency estimation.

The embodiment of multiple linear regression frequency estimation method may also comprise calculation of the phases of Z complex samples in a detected frequency correction burst (FB) signal. The calculated phases are arranged into Q different phase sets according to M types of composition, wherein Q is a sequential accumulation from 1 to M ($Q=1+2+\ldots+M$). For example, if there are 3 ($M=3$) types of composition, the phases are arranged into 6 phase sets ($Q=1+2+3=6$). According to the first type of composition, when $M=1$, the first phase set comprises all the Z phases, whereas for the second type of composition, when $M=2$, the Z phases are evenly divided into 2 phase sets, wherein each phase and its subsequent phase in the same phase set are originally separated by 2 sample distances in the FB signal. Similar to when $M=3$, the Z phases are evenly divided into 3 phase sets. Phase errors are calculated and accumulated for each phase set, and a linear regression slope of each phase set is derived according to the linear regression algorithm. The similarities of the linear regression slopes are examined to avoid phase errors, since the slopes should be identical regardless of the sample distance between adjacent phases of the phase set if the system is ideal. The similar slopes are again treated as acceptable frequency estimation values and these values are averaged as the frequency estimation output. Other slopes are assumed to be unreliable estimations, and thus are excluded from frequency estimation.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION

Figure 1:
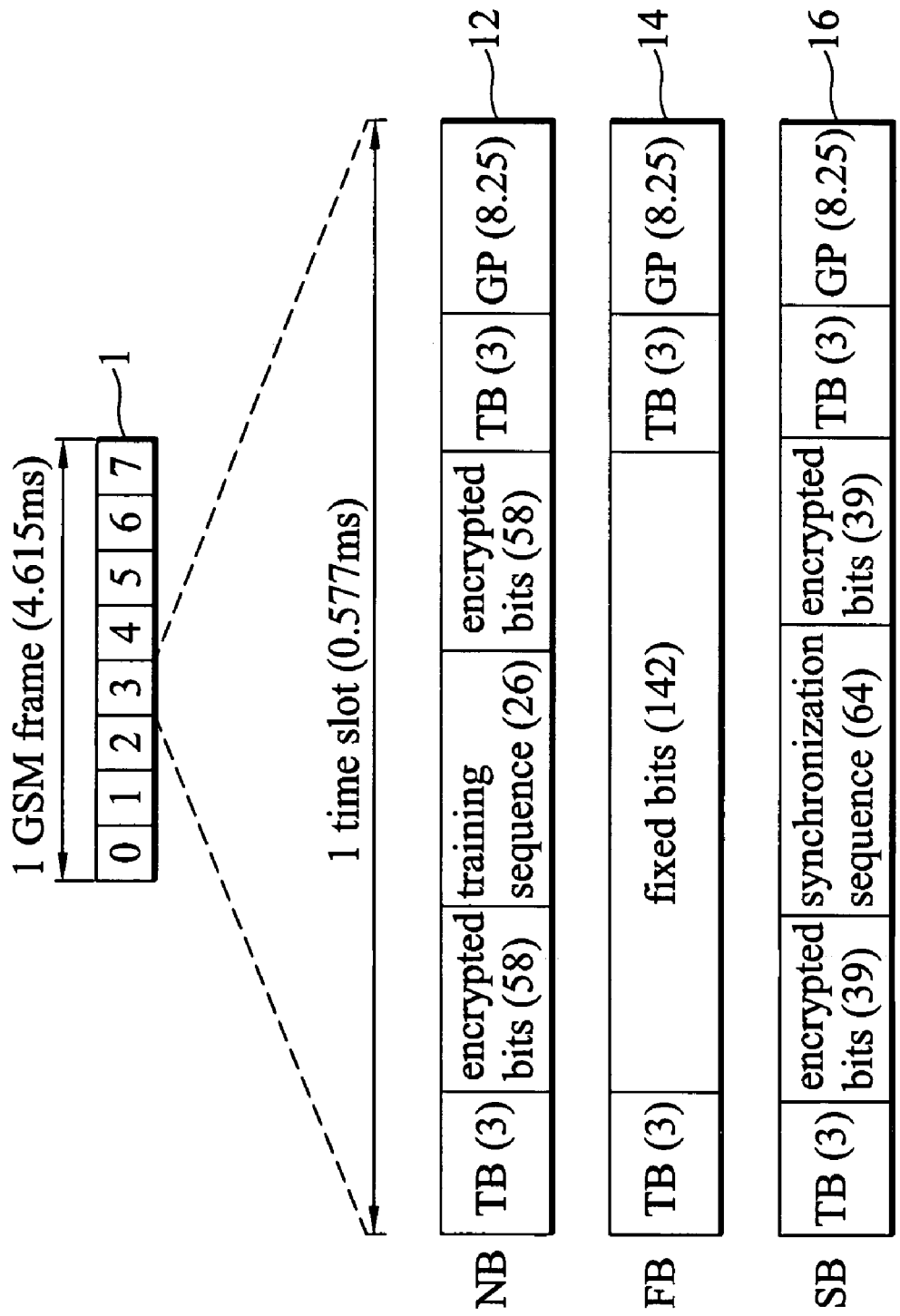
FIG. 1 illustrates the structure of various types of time slots in a GSM frame.

An embodiment of the disclosed multiple linear regression frequency estimation method estimates a frequency offset between a carrier frequency of a transmitter and a local frequency reference of a receiver in wireless communication systems. In an embodiment, the wireless communication is Global System for Mobile Communications (GSM). GSM is an application of Time Division Multiple Access (TDMA), wherein data is transmitted over the channel in bursts, as shown in the frame structure of FIG. 1. A basic frame 1 of GSM comprises eight time slots. Herein are shown three kinds of bursts, normal burst (NB) 12, frequency correction burst (FB) 14, and synchronization burst (SB) 16. The length of a GSM time slot is 156.25 symbol durations, with numbers shown in brackets for individual components in symbols. When the system employs Gaussian filtered Minimum Shift Keying (GMSK) modulation, one symbol represents only one bit. The 3 tail bits (TB), all logical zeros, are used in convolutional decoding of the channel-encoded data bits. The 26-bit training sequence in the middle of the NB 12 is used for channel equalization. The guard period (GP), occupying 8.25 bits, is included at the end of each time slot to prevent data bursts received from mobiles at the base station from overlapping achieved by no signal transmitting during the guard period. The FB 14 comprises 142 fixed bits which can be used for frequency estimation. The SB 16 often follows the FB 14 for synchronization.

Figure 2:
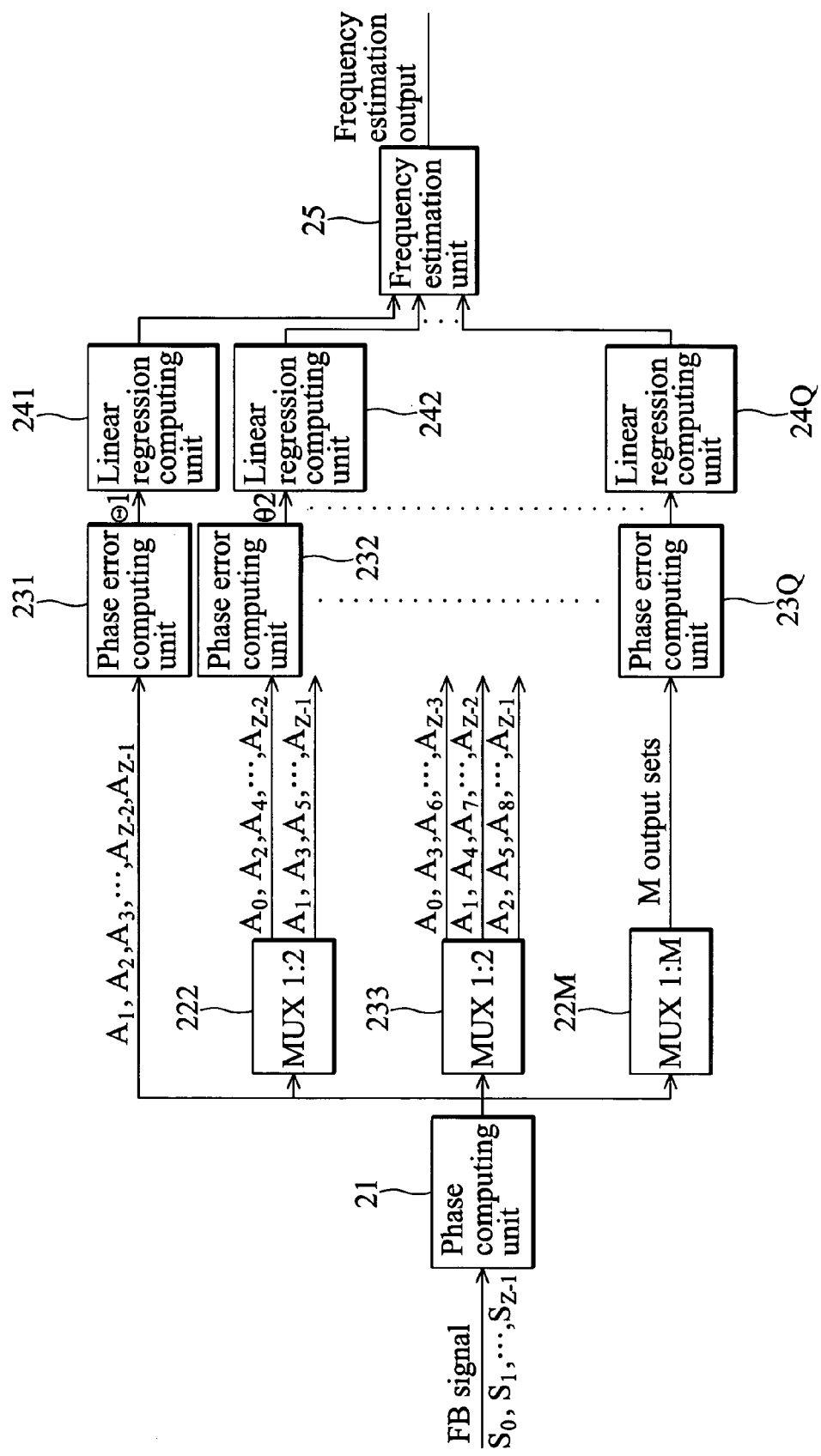
FIG. 2 is a block diagram illustrating the structure of a multiple linear regression frequency estimation method of an embodiment of the invention.

FIG. 2 illustrates the structure of the proposed multiple linear regression frequency estimation. Once a frequency correction burst (FB) signal, sampled as Z complex samples, is detected, a phase computing unit 21 calculates phases $A_0 \sim A_{z-1}$, of the complex samples $S_0 \sim S_{z-1}$, by arc tan the complex samples $S_0 \sim S_{z-1}$. The calculated phases $A_0 \sim A_{z-1}$ are fed to a number (M-1) of multiplexers 222~22M, each having a unique number of output branches. The multiplexer 222, for example, is a 1:2 multiplexer with 2 output branches, whereas the multiplexer 22M is a 1:M multiplexer with M output branches. A total of Q different phase sets is derived from the complex samples $S_0 \sim S_{z-1}$, wherein Q is a sequential accumulation from 1 to M (Q=1+2+ . . . +M). If there are only two multiplexers 222 and 223 in the system, M=3, there will be six (1+2+3=6) phase sets. Each multiplexer divides the phases $A_0 \sim A_{z-1}$, into a specific number of phase sets sequentially, for example, multiplexer 222 divides the phases $A_0 \sim A_{z-1}$ into two phase sets $A_0, A_2, A_4, \ldots, A_{z-2}$ and $A_1, A_3, A_5, \ldots, A_{z-1}$.

Each phase error computing unit 231~23Q receives a phase set from a corresponding multiplexer output, then calculates and accumulates the phase errors. For example, if there are 100 complex samples (Z=100), the phase error vector $\Delta_1$ of the first phase set $A_0 \sim A_{99}$ is $$\left[A_1 - A_0 - \frac{\pi}{2}, A_2 - A_1 - \frac{\pi}{2}, \ldots, A_{99} - A_{98} - \frac{\pi}{2}\right],$$

and a phase summation $\Theta_1$ is $[0, \Delta_1(0), \Delta_1(0)+\Delta_1(1), \ldots, \Delta_1(97)+\Delta_1(98)]$. Similarly, the phase error $\Delta_2$ of the second phase set $A_0, A_2, A_4, \ldots, A_{98}$ is $[A_2-A_0-\pi, A_4-A_2-\pi, \ldots, A_{98}-A_{96}-\pi]$, and a phase summation $\Theta_2$ is $[0, \Delta_2(0), \Delta_2(0)+\Delta_2(1), \ldots, \ldots \Delta_2(48)+\Delta_2(49)]$, and so on. The calculated phase summations $\Theta_1 \sim \Theta_M$ generated by the phase error computing units 231~23Q are sent to their corresponding linear regression computing units 241~24Q for frequency estimation.

Linear regression computing units 241~24Q estimate the slope of each phase error caused by frequency offset. The estimated slope is obtained as follows.

$$\text{slope} = \frac{N \times S_{xy} - S_x \times S_y}{N \times S_{xx} - S_x \times S_x} \qquad \text{Equation (1)}$$

where N denotes the number of inputs, the number of phase errors calculated by a corresponding phase error computing unit 231~23Q, and $S_x$, $S_y$, $S_{xy}$, $S_{xx}$ are defined by equations (2)~(5).

$$S_x = \sum_{n=0}^{N-1} x(n) \qquad \text{Equation (2)}$$

$$S_y = \sum_{n=0}^{N-1} y(n) \qquad \text{Equation (3)}$$

$$S_{xy} = \sum_{n=0}^{N-1} x(n)y(n) \qquad \text{Equation (4)}$$

$$S_{xx} = \sum_{n=0}^{N-1} x^2(n) \qquad \text{Equation (5)}$$

where x(n) is the index of input samples, i.e. the phase errors, and y(n) denotes the nth component (phase error) of the phase error vector.

Once all the linear regression computing units 241~24Q have calculated the slopes, the frequency estimation unit 25 selects similar slopes according to absolute differences.

Figure 3:
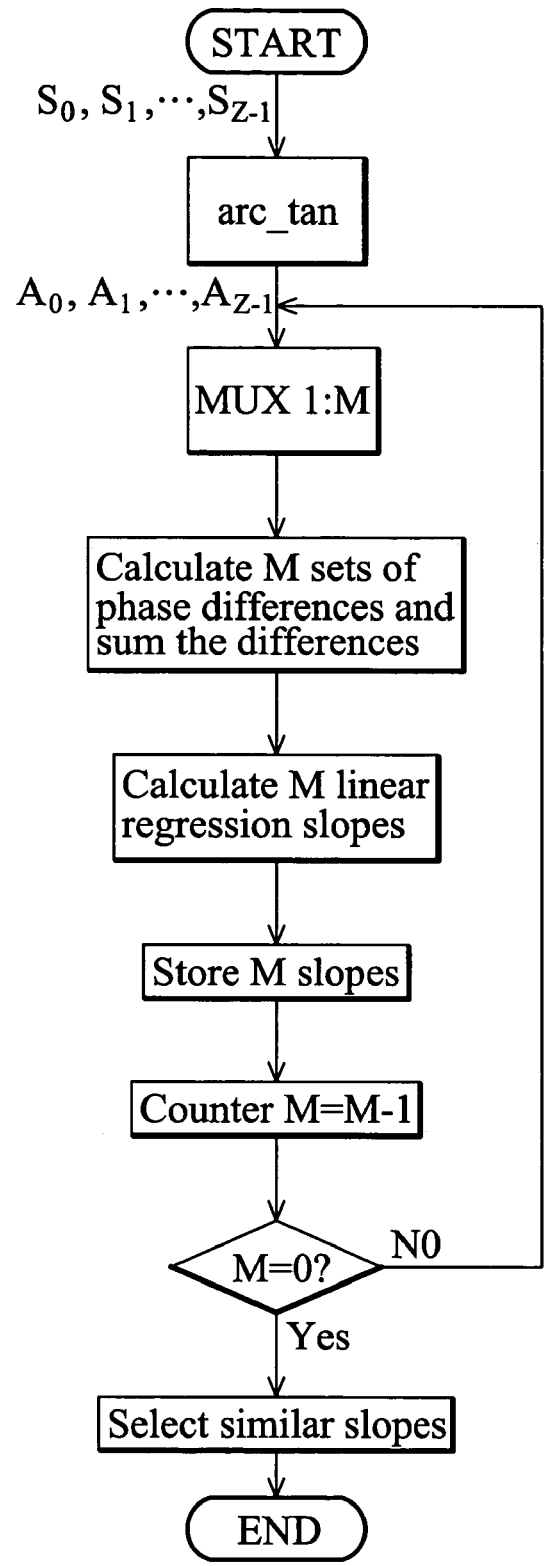
FIG. 3 is a flowchart illustrating the multiple linear regression frequency estimation method of an embodiment of the invention.

The multiple linear regression frequency estimation methods can also be understood by an exemplary flowchart shown in FIG. 3. The phases of the input complex samples are calculated before entering a loop deriving linear regression slopes. The initial value of M is set to satisfy performance, as larger M, increases accuracy as more combinations of samples are considered for frequency estimation. The calculated phases are divided into M different phase sets, and phase errors (phase differences) for each phase set are derived and accumulated. A slope for each set of phase errors is thus derived using the linear regression algorithm and stored for later similar values examination. Once all of the multiplexing combinations have been considered as M reduces to 0, the stored slopes are compared to select only similar values, and frequency is estimated by averaging these selected similar values.

Figure 4:
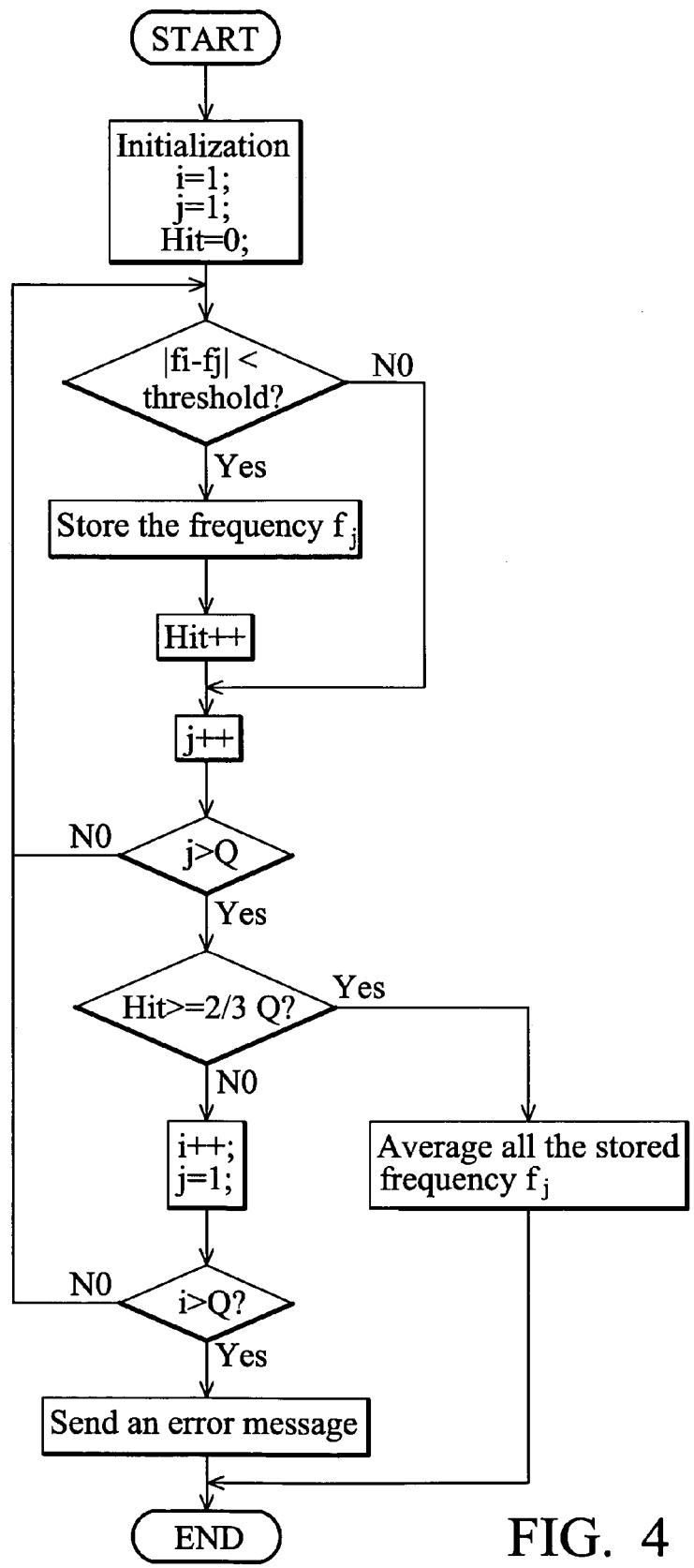
FIG. 4 is a flowchart illustrating selection of similar slopes in the multiple linear regression frequency estimation method of an embodiment of the invention.

From the flowchart of FIG. 3, selection of similar values is further illustrated by the flowchart shown in FIG. 4. A total of Q (Q=1+2+ . . . +M) slopes are calculated, and, in the flowchart of FIG. 4, slopes are checked for how many are close to each other within the preset range defined by a "threshold". If the quantity of similar slopes is more than ⅔ of the total slopes (2Q/3), these similar slopes are considered as "correct frequency estimation results", and the system averages these values as frequency estimation output. As well the remaining dissimilar slopes are discarded as these values are treated as unreasonable error terms.

It will be appreciated by persons skilled in the art, from the foregoing discussion, that various alternative embodiments may be practiced or implemented within the scope and spirit of the present invention. For example, in one embodiment, the multiple linear regression frequency estimation method may further comprise sending an error message if the number of discarded slopes exceeds a preset portion of total calculated slopes. Further still, the multiple linear regression frequency estimation method may be implemented wherein the preset portion is ⅓.

Finally, while the invention has been described by way of examples and in terms of the above, it is to be understood that the invention is not limited to the disclosed embodiments. On the contrary, it is intended to cover various modifications as would be apparent to those skilled in the art.

What is claimed is:

1. A multiple linear regression frequency estimation method, comprising:

detecting a frequency correction burst (FB) signal carrying complex samples;

calculating a phase sequence from the complex samples;

dividing the phase sequence into a plurality of phase subsequences according to a predetermined rule;

calculating phase errors of the phase sequence and each of the phase subsequences individually to obtain a phase error summation for the phase sequence and each of the phase subsequences;

performing linear regression computation on each phase error summation to obtain linear regression slopes; and deriving a frequency from the linear regression slopes.

2. The multiple linear regression frequency estimation method according to claim 1, wherein the phases in the phase sequence are calculated by arc tan.

3. The multiple linear regression frequency estimation method according to claim 1, wherein the slope of a phase error summation, associated with N phase errors, is computed by $$\text{slope} = \frac{N \times S_{xy} - S_x \times S_y}{N \times S_{xx} - S_x \times S_x},$$

wherein $$S_x = \sum_{n=0}^{N-1} x(n),\ S_y = \sum_{n=0}^{N-1} y(n),\ S_y = \sum_{n=0}^{N-1} x(n)y(n),\ S_{xx} = \sum_{n=0}^{N-1} x^2(n),$$

x(n) denotes the index of the phase errors, and y(n) denotes the nth component of the phase errors, wherein n and N are integer values.

4. The multiple linear regression frequency estimation method according to claim 1, wherein derivation of the frequency from the linear regression slopes further comprises computing absolute differences between the linear regression slopes, discarding any slope with an absolute difference exceeding a predetermined threshold, and averaging remaining slopes.

5. The multiple linear regression frequency estimation method according to claim 4, further comprising sending an error message if the number of discarded slopes exceeds a preset portion of total calculated slopes.

6. The multiple linear regression frequency estimation method according to claim 5, wherein the preset portion is ⅓.

7. The multiple linear regression frequency estimation method according to claim 1, wherein division of the phase sequence further comprises:

selecting M types of composition for division of the phase sequence; and obtaining Q phase subsequences by dividing the phase sequence evenly into m phase subsequences according to composition type (the mth type), wherein m belongs to integer 1 to integer M, and Q=1+2+ . . . +M, whereby each phase and its subsequent phase in the same phase subsequence are originally separated by m sample distances in the phase subsequence.

8. A multiple linear regression frequency estimation system, comprising:

a detector, operating to detect a frequency correction burst (FB) signal carrying complex samples;

a phase computing unit, operating to calculate a phase sequence from the complex samples received by the detector;

a dividing unit, operating to divide the phase sequence into a plurality of phase subsequences according to a predetermined rule;

a phase error computing unit, operating to calculate phase errors of the phase sequence and each of the phase subsequences individually and output a phase error summation for the phase sequence and each of the phase subsequences;

a linear regression computing unit, operating to perform linear regression computation on each phase error summation generated by the phase error computing unit, in order to obtain linear regression slopes; and a frequency estimation unit, operating to derive a frequency from the linear regression slopes output from the linear regression computing unit.

9. The multiple linear regression frequency estimator according to claim 8, wherein the phase error computing unit further comprises a plurality of subunits for computing each phase sequence and each of the phase subsequences independently in parallel.

10. The multiple linear regression frequency estimator according to claim 8, wherein the linear regression computing unit further comprises a plurality of subunits for performing linear regression on each phase sequence and each of the phase subsequences independently in parallel.

11. The multiple linear regression frequency estimator according to claim 8, wherein the phase computing unit calculates the phases in the phase sequence from the complex samples by arc tan.

12. The multiple linear regression frequency estimator according to claim 8, wherein the linear regression computing unit estimates a slope of a phase error summation, associated with N phase errors, by $$\text{slope} = \frac{N \times S_{xy} - S_x \times S_y}{N \times S_{xx} - S_x \times S_x},$$

wherein $$S_x = \sum_{n=0}^{N-1} x(n),\ S_y = \sum_{n=0}^{N-1} y(n),\ S_y = \sum_{n=0}^{N-1} x(n)y(n),\ S_{xx} = \sum_{n=0}^{N-1} x^2(n),$$

x(n) denotes the index of the phase errors, and y(n) denotes the nth component of the phase errors, wherein n and N are integer values.

13. The multiple linear regression frequency estimator according to claim 8, wherein the frequency estimation unit derives the frequency by computing absolute differences between the linear regression slopes, discarding any slope with an absolute difference exceeding a predetermined threshold, and averaging remaining slopes.

14. The multiple linear regression frequency estimator according to claim 13, wherein the frequency estimation unit sends an error message if the number of discarded slopes exceeds a preset portion of total calculated slopes.

15. The multiple linear regression frequency estimator according to claim 14, wherein the preset portion is ⅓.

16. The multiple linear regression frequency estimator according to claim 8, wherein the dividing unit further comprises M multiplexers operating to generate o phase sets, each multiplexer dividing the phase sequence evenly into m phase subsequences, wherein m belongs to integer 1 to integer M, and Q=1+2+ . . . +M, whereby each phase and its subsequent phase in the same phase subsequence are originally separated by m sample distances in the phase sequence.

17. A multiple linear regression frequency estimation method, comprising:

detecting a frequency correction burst (FB) signal carrying complex samples;

calculating a phase sequence from the complex samples;

multiplexing the phase sequence evenly into at least two phase subsequences;

calculating phase errors of each phase subsequence individually to obtain a phase error summation for each of the phase subsequences;

performing linear regression computation on each phase error summation to obtain linear regression slopes; and deriving a frequency from the linear regression slopes.

18. A multiple linear regression frequency estimation system, comprising:

a detector, operating to detect a frequency correction burst (FB) signal carrying complex samples;

a phase computing unit, operating to calculate a phase sequence from the complex samples received by the detector;

a multiplexer, operating to divide the phase sequence evenly into at least two phase subsequences;

a phase error computing unit, operating to calculate phase errors of each of the phase subsequences individually and output a phase error summation for each of the phase subsequences;

a linear regression computing unit, operating to perform linear regression computation on each phase error summation generated by the phase error computing unit, in order to obtain linear regression slopes; and a frequency estimation unit, operating to derive a frequency from the linear regression slopes output from the linear regression computing unit.

* * * * *